US011272070B2

(12) United States Patent
Naota et al.

(10) Patent No.: US 11,272,070 B2
(45) Date of Patent: Mar. 8, 2022

(54) ELECTRONIC APPARATUS AND RECORDING MEDIUM

(71) Applicant: KYOCERA Document Solutions Inc., Osaka (JP)

(72) Inventors: Tomonori Naota, Osaka (JP); Shunsuke Mori, Osaka (JP); Motoki Hiratsuka, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/185,022

(22) Filed: Feb. 25, 2021

(65) Prior Publication Data
US 2021/0281704 A1  Sep. 9, 2021

(30) Foreign Application Priority Data

Mar. 4, 2020 (JP) .............................. JP2020-036497
Mar. 4, 2020 (JP) .............................. JP2020-036498
Mar. 4, 2020 (JP) .............................. JP2020-036499

(51) Int. Cl.
*H04N 1/00* (2006.01)

(52) U.S. Cl.
CPC ..... *H04N 1/00938* (2013.01); *H04N 1/00344* (2013.01); *H04N 2201/0094* (2013.01)

(58) Field of Classification Search
CPC ........... H04N 1/00938; H04N 1/00344; H04N 2201/0094
USPC ...................................................... 358/1.13
See application file for complete search history.

(56) References Cited

U.S. PATENT DOCUMENTS

| 2007/0038946 | A1* | 2/2007 | Grieshaber .......... H04N 1/0097 715/762 |
| 2015/0373223 | A1* | 12/2015 | Furushige .......... H04N 1/00347 358/1.13 |
| 2016/0014292 | A1* | 1/2016 | Furushige .......... H04N 1/00941 358/1.13 |
| 2017/0201651 | A1* | 7/2017 | Sugiyama ............ H04N 1/4433 |
| 2017/0223208 | A1* | 8/2017 | Okamoto .................. G06F 8/61 |
| 2019/0104223 | A1* | 4/2019 | Okuno ............... H04N 1/00962 |

FOREIGN PATENT DOCUMENTS

WO  2015/182303  12/2015

OTHER PUBLICATIONS

EPO, Search Report of EP 21159964.2 dated Jun. 25, 2021.

* cited by examiner

*Primary Examiner* — Neil R McLean
(74) *Attorney, Agent, or Firm* — Lex IP Meister, PLLC

(57) ABSTRACT

An image forming apparatus includes extended services that are an extended function service and a backend service, and an extended service manager that manages the extended function service and the backend service. Each extended service provides an extension application with a function other than standard functions of the image forming apparatus, without using a standard application that realizes the standard functions of the image forming apparatus. The extension application is an application that realizes the function other than the standard functions of the image forming apparatus. The standard application is a copy application, a printer application, a facsimile application, or a transmission application.

17 Claims, 11 Drawing Sheets

FIG. 7

1340 SERVICE-MANAGEMENT-INFORMATION TABLE

| EXTENDED SERVICE ID | SERVICE TYPE | AVAILABLE MEMORY SIZE | MAXIMUM CPU USAGE | ACCESS RANGE | INFORMATION SHARING GROUP |
|---|---|---|---|---|---|
| — | EXTENDED SERVICE | — | — | — | — |
| — | EXTENDED FUNCTION SERVICE | — | — | ENTIRE RANGE | — |
| — | BACKEND SERVICE | — | — | ONLY TEMPORARY FILE STORAGE | — |
| ... | ... | ... | ... | ... | ... |
| 0123456 | EXTENDED FUNCTION SERVICE | | | — | ABC001 |
| 0123457 | BACKEND SERVICE | | | — | ABC002 |
| ... | ... | ... | ... | ... | ... |

1341　1342　1343　1344　1345　1346

ELECTRONIC APPARATUS AND RECORDING MEDIUM

INCORPORATION BY REFERENCE

This application claims the benefit of Japanese Priority Patent Applications JP 2020-036497 filed Mar. 4, 2020, JP 2020-036498 filed Mar. 4, 2020, and JP 2020-036499 filed Mar. 4, 2020, the entire contents of which are incorporated herein by reference.

BACKGROUND

Field of the Invention

The disclosure relates to an electronic apparatus and a recording medium that can execute a standard function and another function other than the standard function.

Description of Related Art

An image forming apparatus has been known as a typical electronic apparatus. Such an image forming apparatus is provided with standard applications, extension applications, and extended function services. The standard applications realize standard functions of the image forming apparatus. The extension applications realize functions other than the standard functions of the image forming apparatus. The extended function services provide extended functions of the standard functions of the image forming apparatus to the extension applications without using the standard application.

SUMMARY

An electronic apparatus of the disclosure includes an extended service that provides an extension application with a function other than a standard function of the electronic apparatus without using a standard application as an application realizing the standard function, the extension application being an application realizing the function other than the standard function; and an extended service manager that manages the extended service.

A non-transitory computer-readable recording medium with a program recorded on the recording medium, the program causing a computer of an electronic apparatus to serve as at least one extended service that provides an extension application with a function other than a standard function of the electronic apparatus without using a standard application as an application realizing the standard function, the extension application being an application realizing the function other than the standard function; and an extended service manager that manages the at least one extended service.

BRIEF DESCRIPTION OF THE DRAWINGS

FIG. 7 is a diagram illustrating a modification of the service-management-information table illustrated in FIG. 3;

DETAILED DESCRIPTION

Embodiments of the disclosure will now be described with reference to the accompanying drawings.

The configuration of an image forming apparatus 10 serving as an electronic apparatus according to an embodiment of the disclosure will now be described.

Figure 1:
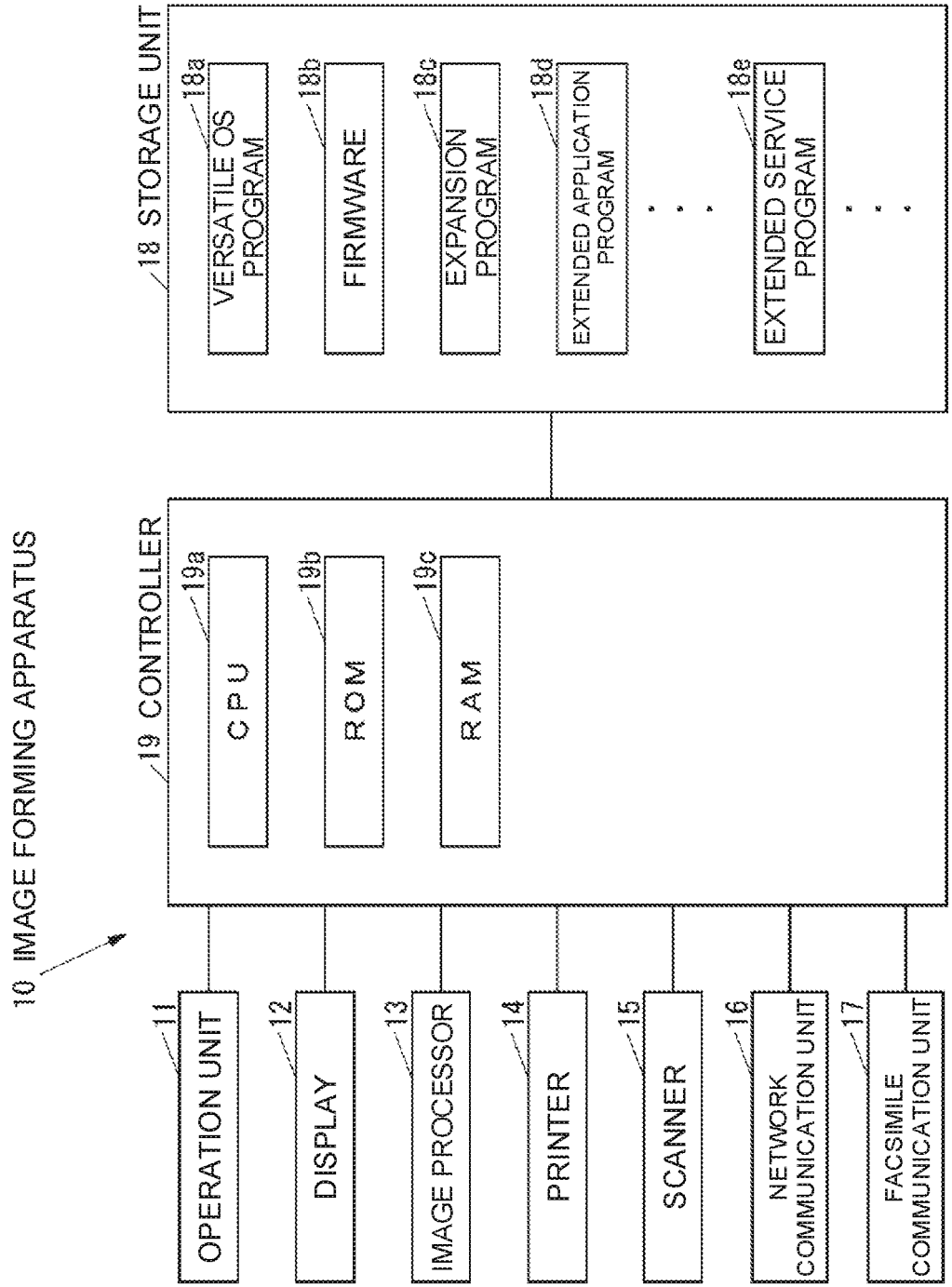
FIG. 1 is a block diagram of hardware of an image forming apparatus according to an embodiment of the disclosure.

FIG. 1 is a block diagram of hardware of the image forming apparatus 10 according to an embodiment.

As illustrated in FIG. 1, the image forming apparatus 10 is a multifunction peripheral (MFP) including an operation unit 11, a display 12, an image processor 13, a printer 14, a scanner 15, a network communication unit 16, a facsimile communication unit 17, a storage unit 18, and a controller 19. The operation unit 11 is an operation device, such as a button, that receives various operations. The display 12 is a display device, such as a liquid crystal display, that displays various information items. The image processor 13 is an image processing device, such as a graphics processing unit (GPU), that performs, on image data, various types of image processing, such as enlargement, reduction, density adjustment, gradation adjustment, and image enhancement. The printer 14 is a printing device that prints an image on a recording medium, such as a sheet. The scanner 15 is a reading device that reads an image on a document. The network communication unit 16 is a communication device that communicates with an external device via a network, such as a local area network (LAN) or the Internet, or directly communicates with an external device via wire or wireless connection without a network. The facsimile communication unit 17 is a facsimile device that establishes facsimile connection with an external facsimile device (not illustrated) via a communication line, such as a public phone line. The storage unit 18 is a non-volatile storage device that stores various information items, such as a semiconductor memory or a hard disk drive (HDD). The controller 19 comprehensively controls the image forming apparatus 10.

The storage unit 18 stores a program 18a for a versatile operating system (OS), such as Linux (registered trademark, hereinafter referred to as a "versatile OS program 18a"). The versatile OS controls each hardware component of the image forming apparatus 10.

The storage unit 18 stores firmware 18b of the image forming apparatus 10.

The storage unit 18 stores an extension program 18c for realizing a function other than standard functions of the image forming apparatus 10.

The storage unit 18 stores a program 18d for an extension application (hereinafter referred to as an "extension application program 18d"). An extension application realizes a function other than the standard functions of the image forming apparatus 10. The storage unit 18 is capable storing an extension application program for every extension application.

The storage unit 18 stores a program 18e for an extended service (hereinafter referred to as an "extended service program 18e"). An extended service provides a service that uses the versatile OS, to the extension application, without using a standard application, which realize a standard function of the image forming apparatus 10. The storage unit 18 is capable of storing an extended service program for every extended service.

The controller 19 includes, for example, a central processing unit (CPU) 19a, a read-only memory (ROM) 19b that stores programs and various data items, and a random-access memory (RAM) 19c that serves as a memory providing a work area for the CPU 19a. The CPU 19a executes the programs stored in the storage unit 18 and the ROM 19b.

Figure 2:
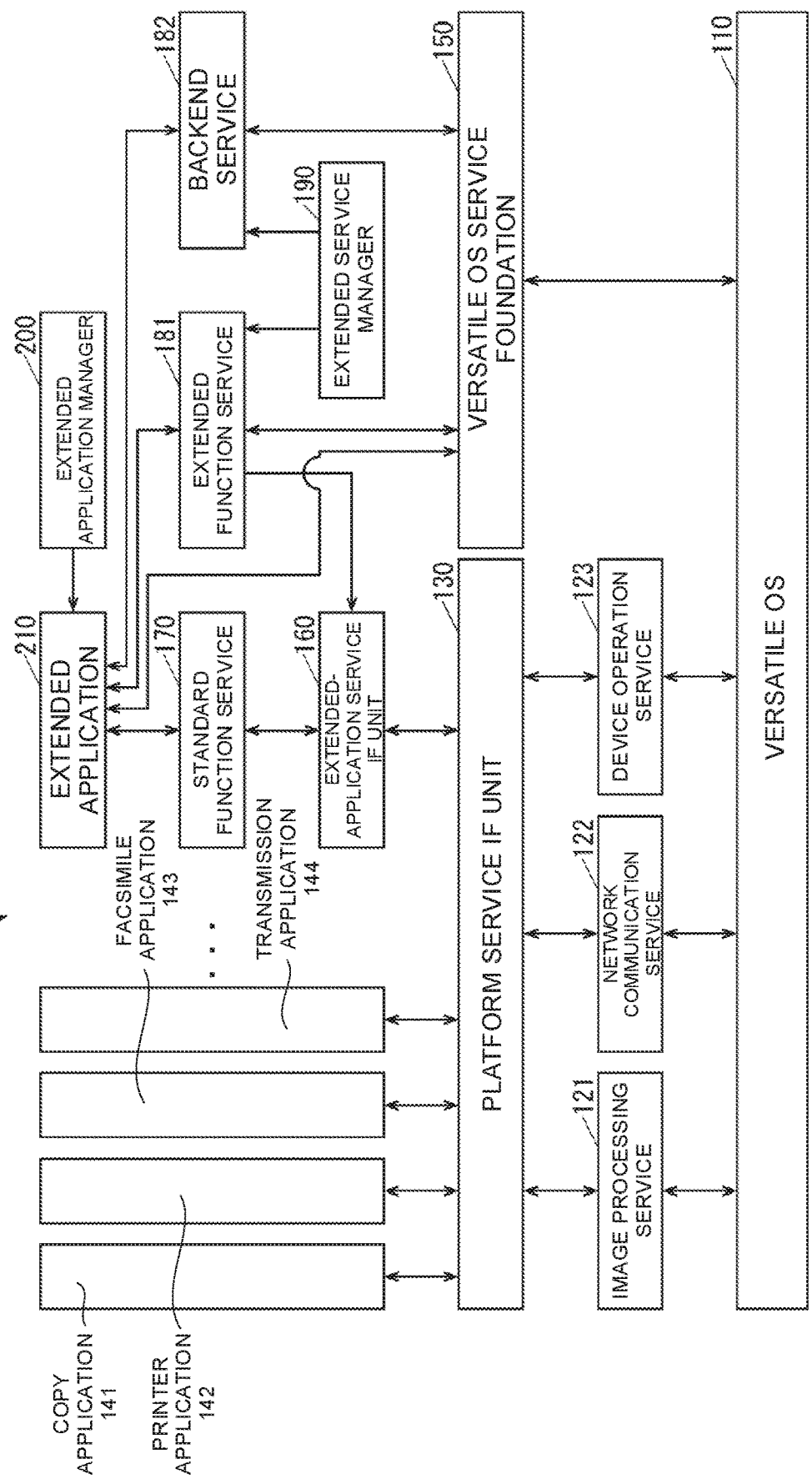
FIG. 2 is a block diagram of a control configuration of the image forming apparatus illustrated in FIG. 1.

The controller 19 executes the programs stored in the storage unit 18 and the ROM 19b to realize the control configuration illustrated in FIG. 2.

FIG. 2 is a block diagram of the control configuration of the image forming apparatus 10.

As illustrated in FIG. 2, the controller 19 executes the versatile OS programs 18a (see FIG. 1) to realize a versatile OS 110.

The controller 19 executes the firmware 18b (see FIG. 1) to realize an image processing service 121, a network communication service 122, and a device operation service 123. The image processing service 121 operates on the versatile OS 110 and provides a service involving image processing. The network communication service 122 operates on the versatile OS 110 and provides a service involving communication via a network. The device operation service 123 operates on the versatile OS 110 and provides a service for operating the hardware components of the image forming apparatus 10. The image processing service 121, the network communication service 122, and the device operation service 123 each control the hardware components of the image forming apparatus 10 via the versatile OS 110.

The image processing service 121 may provide, for example, a service for storing image data read from a document with the scanner 15 at a set resolution and a set color and causing the image processor 13 to process the image data stored in the storage unit 18. The image processing service 121 may provide a service for drawing the image data to be printed by the printer 14 based on a file. The image processing service 121 may provide a service for performing image processing on image data from the extension application, image data read from a document by the scanner 15, and image data stored in the storage unit 18. The image processing includes enlargement, reduction, rotation, color conversion, denoising, format conversion, character recognition, watermark recognition, and the like.

The network communication service 122 may provide a service for performing transmission/reception of files, streaming, and transmission/reception of authentication data via the network communication unit 16 with various protocols, such as TCP/IP and UDP. For example, the network communication service 122 is capable of sending and receiving the image data read from a document by the scanner 15 and the files stored in the storage unit 18. Note that the network communication service 122 is also capable of transmission and reception of image data via the facsimile communication unit 17; transmission and reception of the result of user authentication when the image forming apparatus 10 includes a user authenticating unit that authenticates a user through an IC card or biometric authentication; and transmission and reception of image data generated by a camera when the image forming apparatus 10 includes a camera. The network communication service 122 is also capable of transmission and reception of the state of each component of the image forming apparatus 10 and the result of calling the function of each component.

The device operation service 123 may provide a service for executing processes, such as drawing on the display 12, driving the printer 14, controlling the facsimile communication unit 17, authenticating users, and obtaining the state of the components of the hardware of the image forming apparatus 10. The device operation service 123 may provide, for example, a service for storing image data read from a document by the scanner 15 in the storage unit 18; a service for drawing an image on a browser displayed on the display 12; a service for transmitting image data to the printer 14 to form an image; and a service for transmitting the image data stored in the storage unit 18 via the facsimile communication unit 17. The device operation service 123 may, for example, provide a service for causing an option device, such as a finisher, to perform a process such as bookbinding or stapling when the image forming apparatus 10 includes such an optional device; a service for causing a user authentication unit to perform user authentication when the image forming apparatus 10 includes such a user authentication unit that authenticates a user through an IC card or biometric authentication; and a service for causing a camera to generate image data and a service for calling up functions such as detecting the line of sight based on image data generated by the camera, when the image forming apparatus 10 includes such a camera. The device operation service 123 may provide a service for executing fine control of the components of the hardware of the image forming apparatus 10, such as driving one of the motors of a transporter of the printer 14. The device operation service 123 may provide a service for obtaining the states of the components of the image forming apparatus 10.

The controller 19 is realized a platform service IF unit 130 through execution of the firmware 18b. The platform service IF unit 130 provides an interface for calling the image processing service 121, the network communication service 122, and the device operation service 123.

The controller 19 realizes a standard application through execution of the firmware 18b. A standard application operates on the platform service IF unit 130 and uses the components of the hardware of the image forming apparatus 10. For example, the controller 19 realizes a copy application 141, a printer application 142, a facsimile application 143, and a transmission application 144. The copy application 141 is a standard application that realizes a copy operation of reading an image from a document with the scanner 15 in response to an instruction input to the operation unit 11 and printing the read image with the printer 14. The printer application 142 is a standard application that causes the printer 14 to print an image based on data, such as data described in page description language (PDL), received by the network communication unit 16. The facsimile application 143 is a standard application that causes the scanner 15 to read an image from a document in response to an instruction input to the operation unit 11 and send the read image via the facsimile communication unit 17. The transmission application 144 causes the scanner 15 to read an image from a document in response to an instruction input to the operation unit 11 and send the read image via the network communication unit 16. The printer application 142 may print may cause the printer 14 to print an image based on a file stored in the storage unit 18 in response to an instruction input to the operation unit 11. The facsimile application 143 may cause the facsimile communication unit 17 to transmit an image based on the file received by the network communication unit 16, cause the printer 14 to print an image received by the facsimile communication unit 17, and the storage unit 18 to store an image received by the facsimile communication unit 17.

The controller 19 realizes a versatile-OS service foundation 150 through execution of the extension program 18c (see FIG. 1). The versatile-OS service foundation 150 provides a service that uses the versatile OS 110 without the platform service IF unit 130. The versatile-OS service foundation 150 may provide services for adding functions to the versatile OS 110, for example, by installing control programs, such as device drivers and scripts, on the versatile OS 110.

The controller 19 realizes an extension-application service IF unit 160 through execution of the extension program 18c. The extension-application service IF unit 160 provides an interface for using the platform service IF unit 130 from the side of the extension application.

The controller 19 realizes a standard function service 170 through execution of the extension program 18c. The standard function service 170 uses a standard application to provide a standard function of the image forming apparatus 10 to the extension application. The standard function service 170 uses a standard application via the extension-application service IF unit 160. For example, the extension application can use the standard function service 170 to display a copy start menu of the copy application 141 on the display 12. The extension application can also use the standard function service 170 to cause the printer application 142 to print various types of job data and files that are obtained by the extension application or specified through the operation unit 11. The extension application can also use the standard function service 170 to obtain image data specified via the operation unit 11 from the facsimile image data received by the facsimile application 143 or cause the facsimile application 143 to send a file specified via the operation unit 11.

The controller 19 realizes an extended service through execution of the extended service program (see FIG. 1). An extended service provides a function other than the standard functions of the image forming apparatus 10. For example, the controller 19 realizes an extended function service 181 and a backend service 182. The extended function service 181 is an extended service that provides the extension application with a service that uses the platform service IF unit 130 without use of a standard application or uses the versatile-OS service foundation 150 to use the versatile OS 110. The backend service 182 is an extended service that provides the extension application with a service that uses the versatile-OS service foundation 150 to use the versatile OS 110 without the use of the platform service IF unit 130. The extended function service 181 uses the platform service IF unit 130 via the extension-application service IF unit 160. The controller 19 is capable of realizing at least one extended function service besides the extended function service 181. The controller 19 is capable of realizing at least one backend service besides the backend service 182.

An extended function service provides the extension application with an extended function of a standard function of the image forming apparatus 10.

The backend service operates on the backend. The backend service provides, among functions other than the standard functions of the image forming apparatus 10, a function other than an extended function of a standard function of the image forming apparatus 10. A backend service is, for example, a service for providing a function of monitoring the image forming device 10; a service for providing a function of comprehensive monitoring a system including multiple image forming apparatuses; a service for providing a function of monitoring a specific server; a service for providing a function of collecting, from the image forming apparatus 10, information on a counter indicating the number of printed copies made by the image forming apparatus 10 and converting the collected information into information in a format that is comprehensible by human; or a server for providing a function of converting the format of the information output from the image forming apparatus 10 from a format of an earlier interface to a format of the new interface.

The controller 19 realizes an extended service manager 190 through execution of the extension program 18c. The extended service manager 190 manages the extended services by performing activation, start, stop, and the like of the extended services. The extended service manager 190 monitors the states of the extended services and the versatile-OS service foundation 150.

The controller 19 realizes an extension application manager 200 through execution of the extension program 18c. The extension application manager 200 manages the extension application by performing activation, start, stop, and the like of the extension application.

The controller 19 executes an extension application program 18d (see FIG. 1) to realize an extension application 210. Note that the controller 19 is capable of realizing at least one extension application besides the extension application 210. An extension application is directly used by the user and has a user interface. The user can operate the user interface of an extension application to use the function provided by the extension application. For example, an extension application may be a practical application, an installer application, or any other management application. A practical application may be one for optical character recognition (OCR), water mark creation, invoice creation, employee list management, slip management, contract management, business card management, PDF creation, book management, group management, and the like. An installer application adds or modifies a device driver or firmware on the versatile OS 110. An extension application is capable of calling the standard function service 170 to use a standard application and the versatile OS 110, call an extended service to use the versatile OS 110 without use of a standard application, and directly call the versatile-OS service foundation 150 to use the versatile OS 110.

Figure 3:
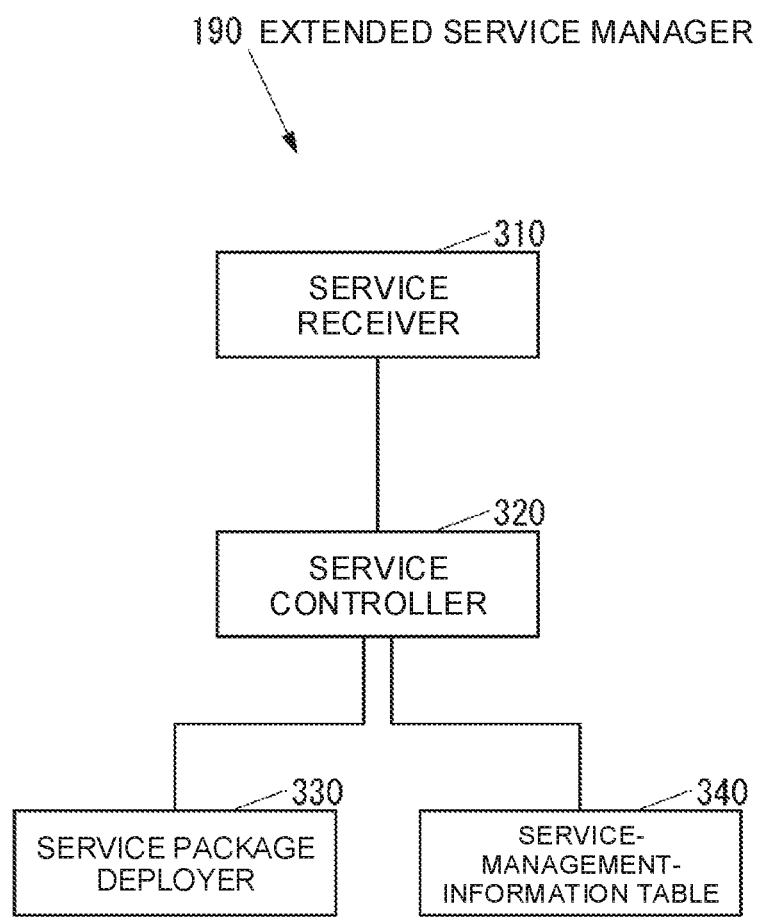
FIG. 3 is a diagram illustrating the configuration of an extended service manager illustrated in FIG. 2.

FIG. 3 is a diagram illustrating the configuration of the extended service manager 190.

As illustrated in FIG. 3, the extended service manager 190 includes a service receiver 310, a service controller 320, a service package deployer 330, and a service-management-information table 340. The service receiver 310 receives a request for a process of adding a new extended service to the image forming apparatus 10 and a request for a process corresponding to an operation, such as updating or deleting, performed on an existing extended service of the image forming apparatus 10. The service controller 320 performs a process corresponding to a request received by the service receiver 310. The service package deployer 330 allocates a software package for a new extended service to be added to the image forming apparatus 10 to a specific location in the storage unit 18 in accordance with an instruction from the service controller 320. The service-management-information table 340 indicates information on an extended service. For example, when a new extended service is to be added to the image forming apparatus 10, the service controller 320 establishes information on the new extended service in the service-management-information table 340.

Figure 4:
FIG. 4 is a diagram illustrating an example of information established in a service-management-information table illustrated in FIG. 3.

FIG. 4 is a diagram illustrating an example of information established in the service-management-information table 340.

As illustrated in FIG. 4, the service-management-information table 340 correlates and registers extended service ID 341, service type 342, available memory size 343, and access permission 344. The extended service ID 341 is identification information of an extended service. The service type 342 indicates that an extended service is either an extended function service or a backend service. The available memory size 343 indicates the size of the RAM 19*c* available for an extended service. The access permission 344 indicates permission for an extended service to access the components, such as standard applications, in the control configuration of the image forming apparatus 10, and the storage unit 18. Note that, in FIG. 4, the specific values of the available memory size and the specific values of access permission are omitted.

Figure 5:
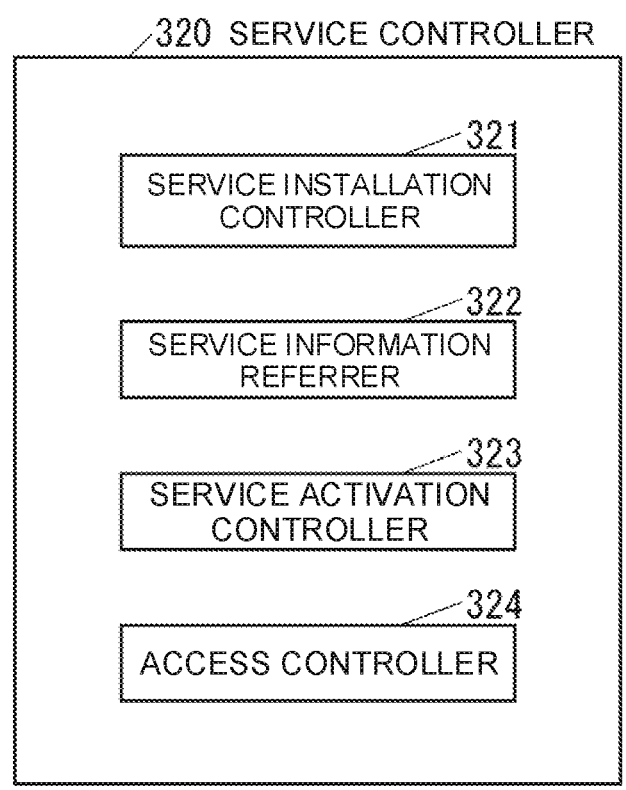
FIG. 5 is a diagram illustrating the configuration of a service controller illustrated in FIG. 3.

FIG. 5 is a diagram illustrating the configuration of the service controller 320.

As illustrated in FIG. 5, the service controller 320 includes a service installation controller 321, a service information referrer 322, a service activation controller 323, and an access controller 324. The service installation controller 321 adds a new extended service to the image forming apparatus 10. The service information referrer 322 refers to information on an extended service in the service-management-information table 340. The service activation controller 323 activates an extended service. The access controller 324 restricts access of the extended service to the components in the control configuration of the image forming apparatus 10, the storage unit 18, etc.

The service activation controller 323 manages the state of each extended service, such as the standby state, the running state, and the paused state.

When an extended service is to be activates, the service activation controller 323 obtains the size of the memory available for the extended service from the service-management-information table 340 via the service information referrer 322. The service activation controller 323 notifies the versatile OS 110 about allocating the obtained available memory size to the extended service. When an extended service is executed, the versatile OS 110 manages the extended service so that the extended service does not exceed the available memory size notified by the service activation controller 323 to be allocated to the extended service. Therefore, even though an extended service can be readily added to the image forming apparatus 10, the possibility of the extended service delaying the execution of a standard function of the image forming apparatus 10 is reduced.

For example, when an extended service is activated, the access controller 324 obtains an access permission for the extended service from the service-management-information table 340 via the service information referrer 322, and notifies the versatile OS 110 about restricting the access of the extended service to the components in the control configuration of the image forming apparatus 10, the storage unit 18, etc., in accordance with the obtained access permission. When the versatile OS 110 executes an extended service, the versatile OS 110 restricts the access by the extended service in accordance with the content notified by the access controller 324. Therefore, even though an extended service can be readily added to the image forming apparatus 10, the possibility of security becoming vulnerable due to the addition of an extended service can be reduced.

As described above, the image forming apparatus 10 includes the extended service manager 190 that manages multiple extended services. Therefore, customization using multiple extended services can be executed. As a result, the customizability can be enhanced. For example, when the image forming apparatus 10 has multiple extended function services for providing extended functions of a standard function of the image forming apparatus 10 to the extension application, customization using the multiple extended function services can be executed. As a result, the customizability can be enhanced. When the image forming apparatus 10 has a backend service for providing a function other than extended functions of a standard function of the image forming apparatus 10, among the functions other than the standard functions of the image forming apparatus 10, to the extension application, customization using the backend service can be executed. As a result, the customizability can be enhanced.

For example, the image forming apparatus 10 may be provided with a backend service for providing a function of converting the format of information output from the image forming apparatus 10 from the format of an earlier interface to the format of a new interface. In this way, compatibility can be enhanced between an existing system used by a user of the image forming apparatus 10, an existing application used by a user of the image forming apparatus 10, and a cloud service used by a user of the image forming apparatus 10.

Any of the programs of this embodiment may be configured as a single program. For example, the extension program 18*c* and the extended service program may be configured as a single program.

The electronic apparatus of the disclosure is the image forming apparatus in this embodiment. Alternatively, the electronic apparatus may be any electronic apparatus besides an image forming apparatus, such as a personal computer (PC).

A first modification of the service controller 320 of the image forming apparatus 10 of the above-described embodiment will now be described. The first modification discloses a configuration of an image forming apparatus capable of reducing the possibility of the process of an extended service wasting resources. The difference between the configuration of the image forming apparatus according to this modification and the configuration of the image forming apparatus according to the above-described embodiment lies in the configuration of the service controller 320, particularly, the operation thereof. Therefore, the same components as those of the image forming apparatus according to the above-mentioned embodiment are designated by the same reference numerals as those in the above-mentioned embodiment, and the description thereof will be omitted unless particularly necessary.

The configuration of the service controller 320 of the image forming apparatus 10 according to the first modification will now be described.

Figure 6:
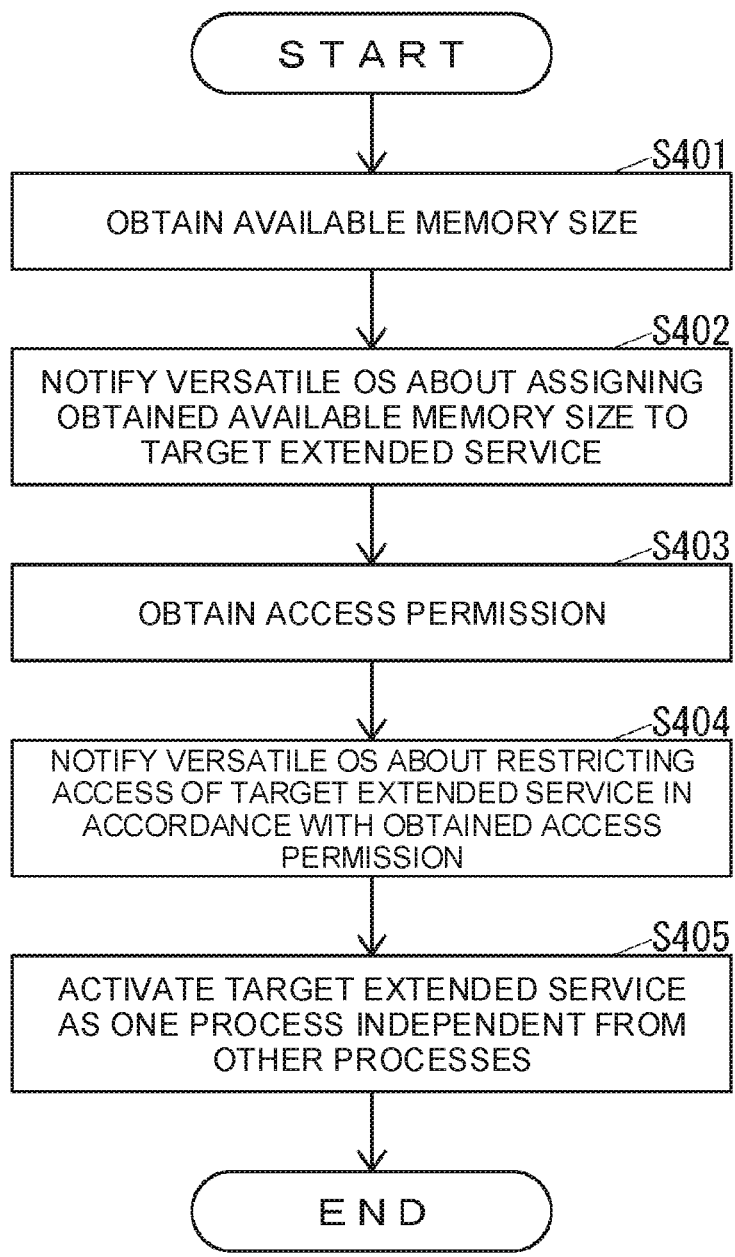
FIG. 6 is a flowchart of the operation of the image forming apparatus illustrated in FIG. 1 for the activation of an extended service.

FIG. 6 is a flowchart of the operation of the image forming apparatus 10 for the activation of an extended service. The CPU 19*a* of the controller 19 executes a program stored in the storage unit 18 or the ROM 19*b* to realize the operation.

The service controller 320 executes the operation illustrated in FIG. 6 for the activation of an extended service.

Note that, in the explanation of the operation illustrated in FIG. 6, the extended service to be activated is referred to as a "target extended service."

As illustrated in FIG. 6, the service activation controller 323 obtains size of the memory available for the target extended service from the service-management-information table 340 via the service information referrer 322 (step S401).

The service activation controller 323 then notifies the versatile OS 110 about allocating the available memory size obtained in step S401 to the target extended service (step S402). Upon receiving the notification in step S402, the versatile OS 110 manages the available memory size notified in step S402 so that the target extended service does not exceed the notified available memory size when the target extended service is executed.

The access controller 324 obtains an access permission for the target extended service from the service-management-information table 340 via the service information referrer 322 (step S403).

The access controller 324 notifies the versatile OS 110 about restricting the access of the target extended service to the components in the control configuration of the image forming apparatus 10, the storage unit 18, etc., in accordance with the access permission obtained in step S403 (step S404). Upon receiving the notification in step S404, the versatile OS 110 restricts the access by the target extended service in accordance with the content notified in step S404 when the target extended service is executed.

The service activation controller 323 activates the target extended service as one process independent from other processes (step S405), and ends the operation illustrated in FIG. 6.

As explained above, the image forming apparatus 10 according to the first modification activates each extended service as one process independent from other processes (step S405). Therefore, when the extended service is ended, the process of the extended service is prevented from remaining as a zombie process. As a result, the possibility of the process of the extended service wasting resources can be reduced.

The image forming apparatus 10 according to this modification activates the extended service in accordance with the restriction for each extended service indicated in the service-management-information table 340. That is, the extended service is activated in accordance with the available memory size set in the service-management-information table 340 (steps S401, S402, and S405). Therefore, the possibility of the extended service process wasting the resources can be reduced. Therefore, even though an extended service can be readily added to the image forming apparatus 10, customization using multiple extended services can be executed, and the possibility of the extended service delaying the execution of a standard function of the image forming apparatus 10 is reduced.

The image forming apparatus 10 according to this modification activates an extended service in accordance with the access permission established in the service-management-information table 340 (steps S403 to S405). Therefore, even though an extended service can be readily added, the possibility of the addition of the extended service causing vulnerability of security is reduced.

A second modification of the service controller 320 of the image forming apparatus 10 of the above-described embodiment will now be described. The second modification discloses a configuration of an image forming apparatus that can reduce the possibility of an extended function service unnecessarily accessing the memory or storage device of the image forming apparatus and affecting the standard functions of the image forming apparatus. The difference between the configuration of the image forming apparatus according to this modification and the configuration of the image forming apparatus according to the above-described embodiment lies in the content of the service-management-information table and the configuration of the service controller 320, particularly, the operation using the service-management-information table. Therefore, the same components as those of the image forming apparatus according to the above-mentioned embodiment are designated by the same reference numerals as those in the above-mentioned embodiment, and the description thereof will be omitted unless particularly necessary.

The configuration of the image forming apparatus 10 according to the second modification will now be described.

FIG. 7 is a diagram illustrating an example of information established in a service-management-information table 1340 according to the second modification.

As illustrated in FIG. 7, the service-management-information table 1340 correlates and registers extended service ID 1341, service type 1342, available memory size 1343, maximum CPU usage rate 1344, access range 1345, and information sharing group 1346. The extended service ID 1341 is identification information of an extended service. The service type 1342 indicates that an extended service is either an extended function service or a backend service. The available memory size 1343 indicates the size of the RAM 19c available for an extended service. The maximum CPU usage rate 1344 indicates the maximum usage rate for the CPU 19a by an extended service. The access range 1345 indicates the range of the storage unit 18 accessible by an extended service. The information sharing group 1346 indicates a group sharing information. Note that, in FIG. 7, the specific values of the available memory size and the specific values of the maximum CPU usage rate are omitted.

In the service-management-information table 1340 illustrated in FIG. 7, the available memory size and the maximum CPU usage rate correlated to an extended service ID corresponding to a value indicating an "extended service" are the available memory and the maximum CPU usage rate for the extended service relative to those of the entire group of extended services. The available memory size, the maximum CPU usage rate, and the access range correlated to an extended service ID corresponding to a value indicating an "extended function service" are the available memory, the maximum CPU usage rate, and the access range of the extended function service relative to those of the entire group of extended function services. The available memory size, the maximum CPU usage rate, and the access range correlated to an extended service ID corresponding to a value indicating a "backend service" are the available memory, the maximum CPU usage rate, and the access range of the backend service relative to those of the entire group of backend services. Note that, in the service-management-information table 1340, it is preferable that the information correlated to an extended service ID corresponding to a value indicating an "extended service," an "extended function service," or a "backend service" be established before a new extended service is added to the image forming apparatus 10.

An extended function service provides an extended function of a standard function of the image forming apparatus 10 to the extension application. Thus, the function of accessing the storage unit 18 is also an extension of the standard function of the image forming apparatus 10. Therefore, the extended function service is unlikely to execute illegal access, such as illegal extraction of data from the storage unit 18. Therefore, in the service-management-information table 1340 illustrated in FIG. 7, the access range for the entire group of extended function services is set to "entire range."

A backend service provides a function other than the extended functions of the standard functions of the image forming apparatus 10, among the functions other than the standard functions of the image forming apparatus 10. Therefore, the function of accessing the storage unit 18 is not an extension of a standard function of the image forming apparatus 10. Therefore, a backend service is more likely to execute illegal access, such as illegal extraction of data from the storage unit 18, in comparison to an extended function service. Therefore, in the service-management-information table 1340 illustrated in FIG. 7, the access range of the entire group of backend services is smaller than that of the entire group of extended function services and is set to "only temporary file storage."

The control operation of the service controller 320 using the service-management-information table 1340 of FIG. 7 will now be explained. The control operation is also realized by the CPU 19*a* of the controller 19 executing a program stored in the storage unit 18 or the ROM 19*b*, as in the above-described embodiment and the first modification.

Figure 8:
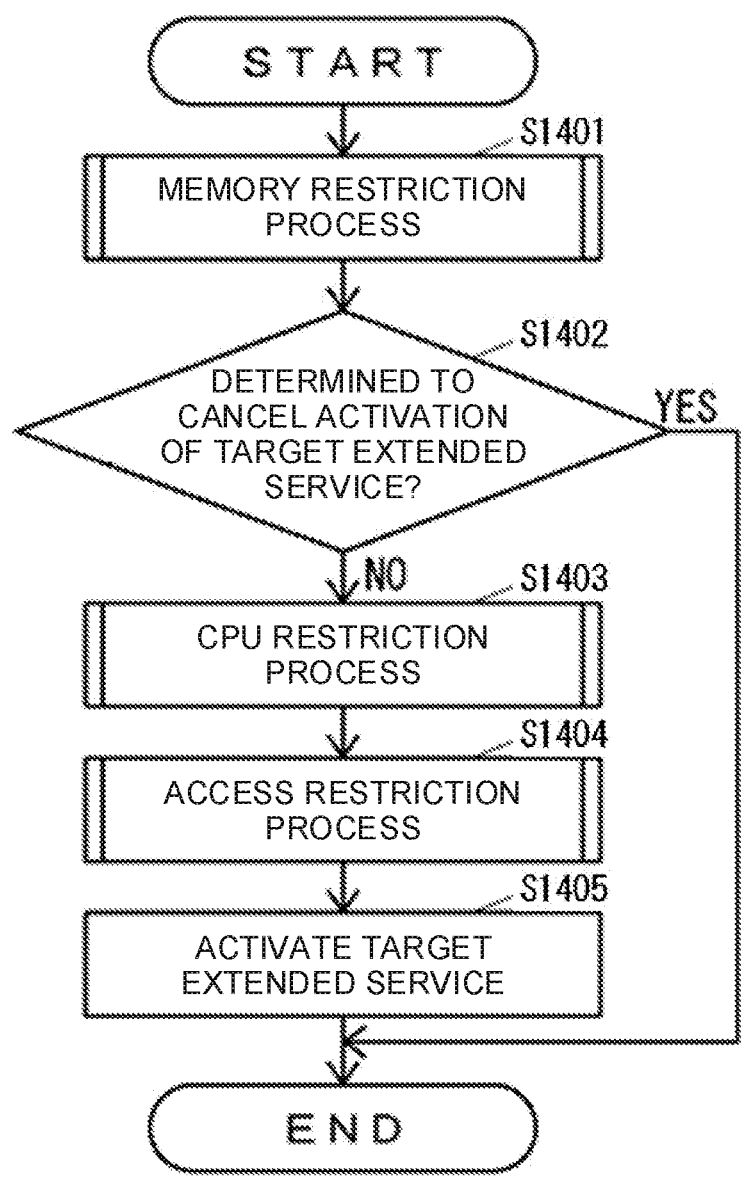
FIG. 8 is a flowchart of the operation of the image forming apparatus illustrated in FIG. 1 for the activation of an extended service.

FIG. 8 is a flowchart of the operation of the image forming apparatus 10 for the activation of an extended service.

The service controller 320 executes the operation illustrated in FIG. 8 for the activation of an extended service. Note that, in the explanation of the operation illustrated in FIG. 8, the extended service to be activated is referred to as a "target extended service."

As illustrated in FIG. 8, the service activation controller 323 executes a memory restriction process of restricting an extended service based on the available memory size (step S1401).

Figure 9:
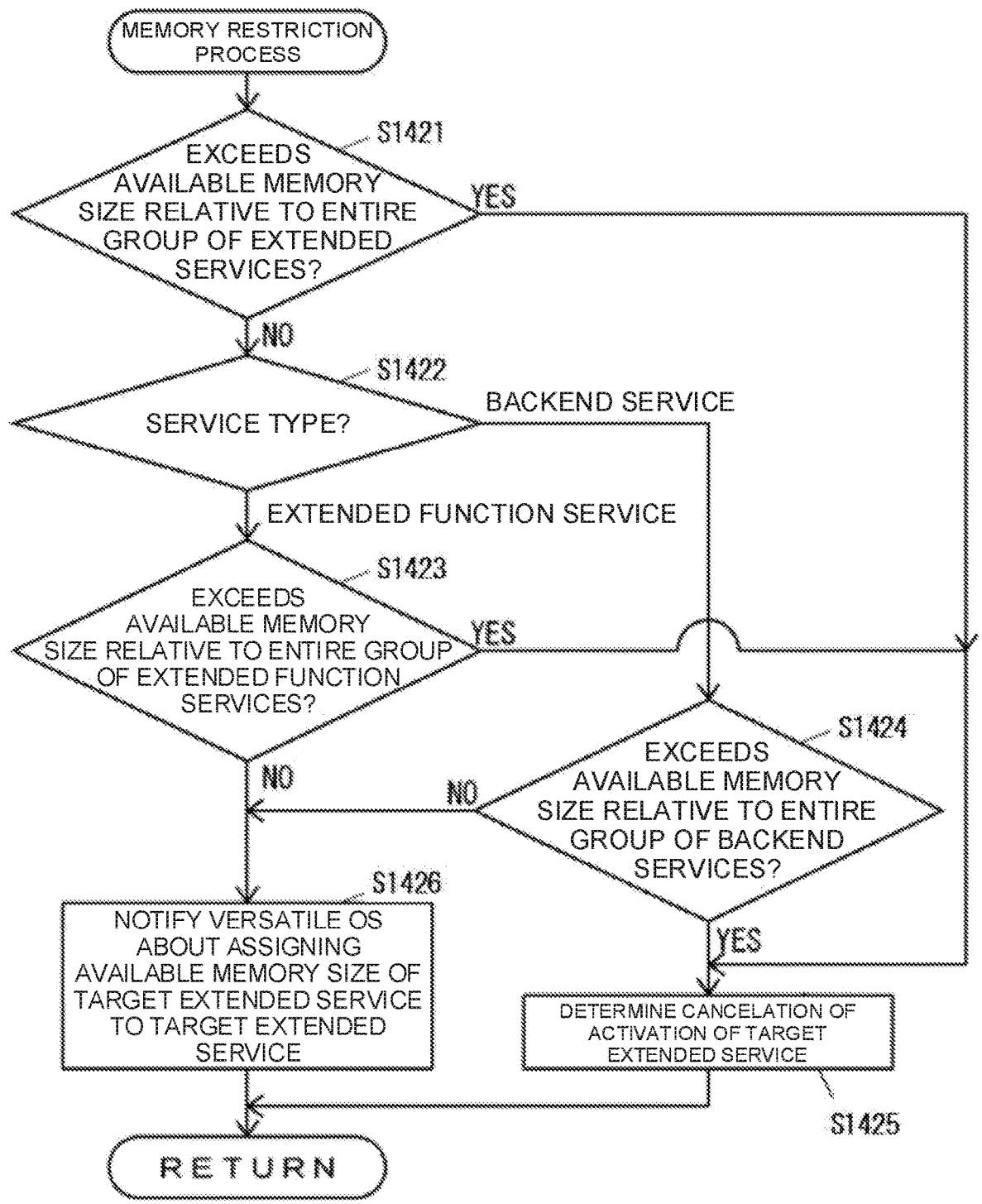
FIG. 9 is a flowchart of the memory restriction process illustrated in FIG. 8.

FIG. 9 is a flowchart of the memory restriction process illustrated in FIG. 8.

As illustrated in FIG. 9, the service activation controller 323 determines whether or not the sum of the available memory sizes of all extended services already being executed and the available memory size of the target extended service exceeds the available memory size of the entire group of extended services (step S1421). Here, the service activation controller 323 obtains the available memory size of each extended service and the available memory size of the entire group of the extended services from the service-management-information table 1340 via the service information referrer 322.

If the service activation controller 323 determines in step S1421 that the sum of the available memory size of all extended services already being executed and the available memory size of the target extended service does not exceed the available memory size of the entire group of extended services, the service activation controller 323 determines the service type of the target extended service (step S1422). Here, the service activation controller 323 obtains the service type of the target extended service from the service-management-information table 1340 via the service information referrer 322.

If the service activation controller 323 determines in step S1422 that the service type of the target extended service is an extended function service, the service activation controller 323 determines whether or not the sum of the available memory size of all extended function services already being executed and the available memory size of the target extended service exceeds the available memory size of the entire group of extended function services (step S1423). Here, the service activation controller 323 obtains the available memory size of the entire group of extended function services from the service-management-information table 1340 via the service information referrer 322.

If the service activation controller 323 determines in step S1422 that the service type of the target extended service is a backend service, the service activation controller 323 determines whether or not the sum of the available memory size of all backend services already being executed and the available memory size of the target extended service exceeds the available memory size of the entire group of backend services (step S1424). Here, the service activation controller 323 obtains the available memory size of the entire group of backend services from the service-management-information table 1340 via the service information referrer 322.

The service activation controller 323 determines to cancel the activation of the target extended service (step S1425) in any one of the following three cases: in step S1421, the sum of the available memory size of all extended services already being executed and the available memory size of the target extended service exceeds the available memory size of the entire group of extended services; in step S1423, the sum of the available memory size of all extended function services already being executed and the available memory size of the target extended service exceeds the available memory size of the entire group of extended function services; and in step S1424, the sum of the available memory size of all backend services already being executed and the available memory size of the target extended service exceeds the available memory size of the entire group of backend services. The service activation controller 323 then ends the memory restriction process illustrated in FIG. 9.

The service activation controller 323 notifies the versatile OS 110 about the allotment of the memory corresponding to the available memory size of the target extended service to the target extended service (step S1426) in one of the following cases: in step S1423, the sum of the available memory size of all extended function services already being executed and the available memory sizes of the target extended service does not exceed the available memory size of the entire group of extended function services; and, in step S1424, the sum of the available memory size of all backend services already being executed and the available memory size of the target extended service does not exceed the available memory size of the entire group of backend services. The service activation controller 323 then ends the memory restriction process illustrated in FIG. 9. Upon receiving the notification in step S1426, the versatile OS 110 manages the target extended service so that the target extended service does not exceed the available memory size notified in step S1426 when the target extended service is executed.

As illustrated in FIG. 8, when the memory restriction process in step S1401 is completed, the service activation controller 323 determines whether or not the cancelation of the activation of the target extended service has been determined in the memory restriction process in step S1401 (step S1402).

If the service activation controller 323 determines in step S1402 that the cancelation of the activation of the target extended service has been determined in the memory restriction process in step S1401, the operation illustrated in FIG. 8 ends.

If the service activation controller 323 determines in step S1402 that the cancelation of the activation of the target extended service has not been determined in the memory restriction process in step S1401, the service activation controller 323 executes the CPU restriction process of restricting the extended service based on the maximum CPU usage rate (step S1403).

Figure 10:
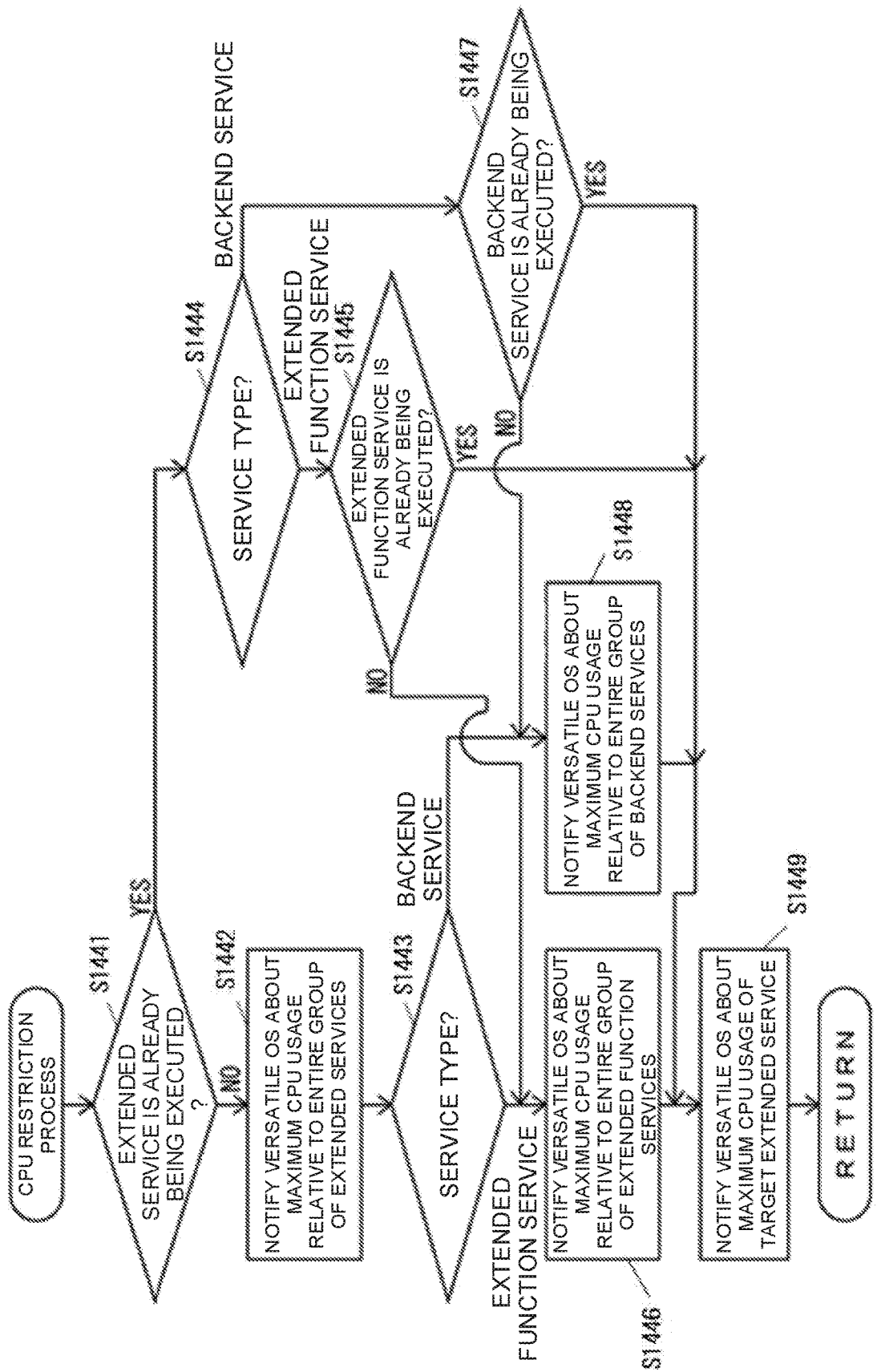
FIG. 10 is a flowchart of the CPU restriction process illustrated in FIG. 8.

FIG. 10 is a flowchart of the CPU restriction process illustrated in FIG. 8.

As illustrated in FIG. 10, the service activation controller 323 determines whether or not an extended service is already being executed (step S1441).

If the service activation controller 323 determines in step S1441 that no extended service is already being executed, the service activation controller 323 notifies the versatile OS 110 about the maximum CPU usage rate for the entire group of extended services (step S1442). Here, the service activation controller 323 obtains the maximum CPU usage rate for the entire group of extended services from the service-management-information table 1340 via the service information referrer 322. Upon receiving the notification in step S1442, the versatile OS 110 manages the entire group of extended services so that the entire group does not exceed the maximum CPU usage rate notified in step S1442 when an extended service is executed.

After the process in step S1442, the service activation controller 323 determines the service type of the target extended service (step S1443). Here, the service activation controller 323 obtains the service type of the target extended service from the service-management-information table 1340 via the service information referrer 322.

If the service activation controller 323 determines in step S1441 that an extended service is already being executed, the service activation controller 323 determines the service type of the target extended service (step S1444). Here, the service activation controller 323 obtains the service type of the target extended service from the service-management-information table 1340 via the service information referrer 322.

If the service activation controller 323 determines in step S1444 that the service type of the target extended service is an extended function service, the service activation controller 323 determines whether or not an extended function service is already being executed (step S1445).

If the service activation controller 323 determines in step S1443 that the service type of the target extended service is an extended function service or determines in step S1445 that no extended service is already being executed, the service activation controller 323 notifies the versatile OS 110 about the maximum CPU usage rate of the entire group of extended function services (step S1446). Here, the service activation controller 323 obtains the maximum CPU usage rate for the entire group of extended function services from the service-management-information table 1340 via the service information referrer 322. Upon receiving the notification in step S1446, the versatile OS 110 manages the maximum CPU usage rate notified in step S1446 so that the entire group of extended function services so that the entire group of extended function services does not exceed the maximum CPU usage rate when an extended function service is executed.

If the service activation controller 323 determines in step S1444 that the service type of the target extended service is a backend service, the service activation controller 323 determines whether or not a backend service is already being executed (step S1447).

If the service activation controller 323 determines in step S1443 that the service type of the target extended service is a backend service or determines in step S1447 that no backend service is already being executed, the versatile OS 110 is notified about the maximum CPU usage rate for the entire group of backend services (step S1448). The service activation controller 323 obtains the maximum CPU usage rate for the entire group of the backend services from the service-management-information table 1340 via the service information referrer 322. Upon receiving the notification in step S1448, the versatile OS 110 manages the maximum CPU usage rate notified in step S1448 so that the entire group of the backend services does not exceed the maximum CPU usage rate when the backend service is executed.

If the service activation controller 323 determines in step S1445 that an extended function service is already being executed, if the process in step S1446 ends, if the service activation controller 323 determines in step S1447 that a backend service is already being executed, or if the process in step S1448 ends, the service activation controller 323 notifies the versatile OS 110 about the maximum CPU usage rate of the target extended service (step S1449). The service activation controller 323 obtains the maximum CPU usage rate for the target extended service from the service-management-information table 1340 via the service information referrer 322. Upon receiving the notification in step S1449, the versatile OS 110 manages the target extended service so that the target extended service does not exceed the maximum CPU usage rate notified in step S1449 when the target extended service is executed.

The service activation controller 323 ends the CPU restriction process illustrated in FIG. 10 after the process in step S1449.

As illustrated in FIG. 10, after the CPU restriction process in step S1403 has ended, the access controller 324 executes the access restriction process of restricting an extended service based on the access range (step S1404).

Figure 11:
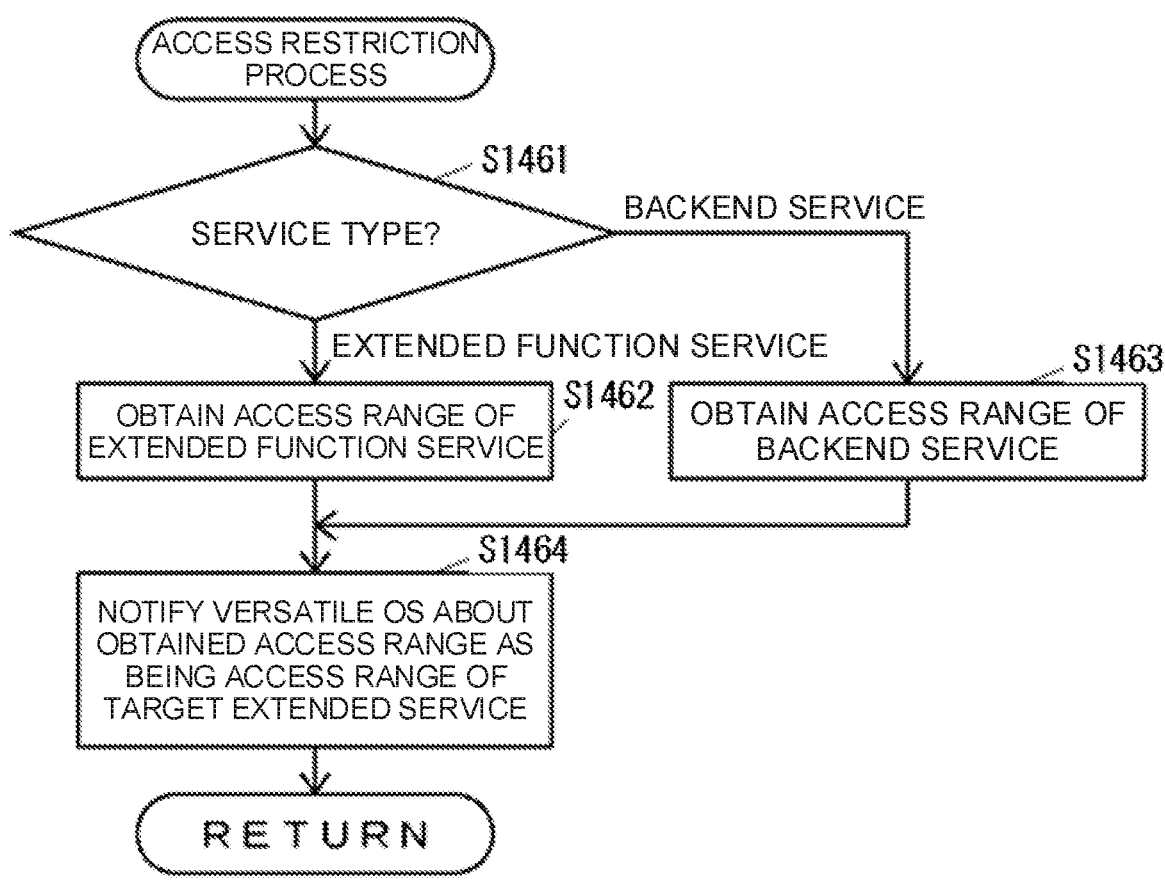
FIG. 11 is a flowchart of the access restriction process illustrated in FIG. 8.

FIG. 11 is a flowchart of the access restriction process illustrated in FIG. 8.

As illustrated in FIG. 11, the access controller 324 determines the service type of the target extended service (step S1461). Here, the access controller 324 obtains the service type of the target extended service from the service-management-information table 1340 via the service information referrer 322.

If the access controller 324 determines in step S1461 that the service type of the target extended service is an extended function service, the access controller 324 obtains the access range correlated to the extended service ID indicating a value corresponding to an "extended function service" in the service-management-information table 1340 via the service information referrer 322 (step S1462).

If the access controller 324 determines in step S1461 that the service type of the target extended service is a backend service, the access controller 324 obtains the access range correlated to the extended service ID indicating a value corresponding to a "backend service" in the service-management-information table 1340 via the service information referrer 322 (step S1463).

After the process in step S1462 or S1463, the access controller 324 notifies the versatile OS 110 about determining the access range obtained in step S1462 or S1463 to be the access range of the target extended service (step S1464), and ends the access restriction process illustrated in FIG. 11. Upon receiving the notification in step S1464, the versatile OS 110 manages the target extended service so that the target extended service does not exceed the maximum CPU usage rate notified in step S1464 when the target extended service is executed.

As illustrated in FIG. 8, when the access restriction process in step S1404 ends, the service activation controller 323 activates the target extended service correlating the information indicating that the target extended service is an extended service and the information indicating that the target extended service is an extended function service or a backend service (step S1405). The service activation controller 323 then ends the operation illustrated in FIG. 8. Since the information indicating that the target extended service is an extended service is correlated to the target extended service, the versatile OS 110 can execute the target extended service so that the entire group of extended services does not exceed the available memory size, the maximum CPU usage rate, and the access range of the entire group of extended services. Since the information indicating that the target extended service is an extended function service or a backend service is correlated to the target extended service, it is possible to execute the target extended service so that the entire group of extended function services does not exceed the available memory size, the maximum CPU usage rate, and the access range of the entire group of extended function services, or execute the target extended service so that the entire group of backend services does not exceed the available memory size, the maximum CPU usage rate, and the access range of the entire group of the backend services.

An extended service can use an area on the RAM 19c and an area on the storage unit 18 used by other extended services in the same information sharing group as the extended service. Therefore, multiple extended services in the same information sharing group can share information via the area on the RAM 19c and the area on the storage unit 18. Note that an extended service may determine whether or not to allow access to an area in the RAM 19c or the storage unit 18 dedicated to the extended service by other extended services. If access by other extended services is allowed, the other extended services in the same information sharing group as the extended service may use an area dedicated to the extended service. An extended service may determine whether or not to allow other extended services to access a specific area in the shared area in the RAM 19c or the storage unit 18. If access by other extended services is allowed, the other extended services in the same information sharing group as the extended service may use the specific area.

As described above, the image forming apparatus 10 of this modification restricts an extended service based on the available memory size established in the service-management-information table 1340. Therefore, the possibility of an extended service delaying the execution of the standard functions of the image forming apparatus 10 can be reduced even though an extended service, which provides a function other than the standard functions of the image forming apparatus 10 to the extension application, can by readily added. That is, when the image forming apparatus 10 provides a function other than the standard functions of the image forming apparatus 10, customization using multiple extended function services can be executed, and the possibility of affecting the standard functions of the image forming apparatus 10 can be reduced.

The image forming apparatus 10 of this modification restricts an extended service based on the maximum CPU usage rate established in the service-management-information table 1340. Therefore, the possibility of an extended service delaying the execution of the standard functions of the image forming apparatus 10 can be reduced even though an extended service, which provides a function other than the standard functions of the image forming apparatus 10 to the extension application, can by readily added. That is, when the image forming apparatus 10 provides a function other than the standard functions of the image forming apparatus 10, the possibility of affecting the standard functions of the image forming apparatus 10 can be reduced. For example, an execution delay due to a load applied to the CPU 19a as a result of multiple extended services being executed occurs only between the extended services. An execution delay due to a load applied to the CPU 19a as a result of multiple extended function services being executed occurs only between the extended function services. An execution delay due to a load applied to the CPU 19a as a result of multiple backend services being executed occurs only between the backend services.

The image forming apparatus 10 of this modification restricts an extended service on the basis of an access range established in the service-management-information table 1340. Therefore, the possibility of a vulnerability in security due to the addition of an extended service can be reduced even though an extended service, which provides a function other than the standard functions of the image forming apparatus 10 to the extension application, can by readily added. Therefore, when the image forming apparatus 10 provides a function other than the standard functions of the image forming apparatus 10, customization using multiple extended function services can be executed, and the possibility of affecting the standard functions of the image forming apparatus 10 can be reduced.

In the image forming apparatus 10 of this modification of this embodiment, established are the available memory size for each extended service, the available memory size for the entire group of extended function services, the available memory size for the entire group of backend services, and the available memory size for the entire group of extended services. However, in the image forming apparatus 10, at least one of the following may not be established: the available memory size for each extended service; the available memory size for the entire group of extended function services; the available memory size for the entire group of backend services; and the available memory size for the entire group of extended services.

In the image forming apparatus 10 of this modification of this embodiment, established are the maximum CPU usage rate for each extended service, the maximum CPU usage rate for the entire group of extended function services, the maximum CPU usage rate for the entire group of backend services, and the maximum CPU usage rate for the entire group of extended services. However, in the image forming apparatus 10, at least one of the following may not be established: the maximum CPU usage rate for each extended service; the maximum CPU usage rate for the entire group of extended function services; the maximum CPU usage rate for the entire group of backend services; and the maximum CPU usage rate for the entire group of extended services.

In the image forming apparatus 10 of this modification, an access range different from that illustrated in FIG. 7 may be established as an access range for the entire group of extended function services and an access range for the entire group of backend services. In the image forming apparatus 10, an access range may be established for each extended service, or an access range may be established for the entire group of extended services.

In the image forming apparatus 10 of this modification of this embodiment, the available memory size, the maximum CPU usage rate, the access range, and the information sharing group are registered in the service-management-information table 1340 for each extended service and applied to each extended service. Alternatively, the available memory size, the maximum CPU usage rate, the access range, and the information sharing group may be registered in the service-management-information table 1340 for each type of service combining multiple extended services and applied to each type of service combining multiple extended services. When the image forming apparatus 10 restricts a service combining multiple extended services, the possibility of the service combining multiple extended services affecting the standard functions of the image forming apparatus 10 can be reduced. Examples of types of services combining multiple extended services include a service combining any two extended function services, a service combining any two backend services, a service combining two specific extended function services, a service combining two specific backend services, a service combining any extended function service and any backend service, and a service combining a specific extended function service and a specific backend service. Alternatively, three or more extended services may be combined. Each extended service in the combination may be any extended service or a specific extended service.

Other embodiments of the disclosure will now be described. A recording medium recording a program code for software that realizes any function of the above-described embodiment and its modifications is supplied to the system or device, and the computer of the system or apparatus reads out the program code recorded on the recording medium. The image forming apparatus of the present disclosure can also be achieved by executing the above. In this case, the program code read from the recording medium realizes the function of the above-described embodiment, and the recording medium recording the program code constitutes the disclosure. Not only are the functions of the above-described embodiment and its modifications realized by executing the program code read by the computer but the functions are also realized by actual processing of which a part or all is performed by an operating system (OS) that operates on the computer on the basis of the instruction of the program code.

What is claimed is:

1. An electronic apparatus, having a hardware processor executing computer instructions, comprising:
   an extended service that provides an extension application with a function other than a standard function of the electronic apparatus without using a standard application as an application realizing the standard function, the extension application being an application realizing the function other than the standard function;
   an extended service manager that manages the extended service; and
   a backend service as the extended service that provides the extension application with a function other than an extended function of the standard function among functions other than the standard function, wherein
   the extended service manager executes a restriction on the extended service, and
   the extended service manager executes the restriction on an entire group of backend services.

2. The electronic apparatus according to claim 1, wherein the extended service includes at least one extended service, and
   the extended service manager manages the at least one extended service.

3. The electronic apparatus according to claim 1, comprising at least one extended function service as the extended service that provides the extension application with an extended function of the standard function.

4. The electronic apparatus according to claim 1, comprising at least one backend service as the extended service that provides the extension application with a function other than an extended function of the standard function among functions other than the standard function.

5. The electronic apparatus according to claim 1, wherein the extended service manager activates each extended service as one process independent of other processes.

6. The electronic apparatus according to claim 1, wherein
   the extended service manager has service management information indicating a restriction on the extended service, and
   the extended service manager activates the extended service in accordance with the restriction indicated by the service management information.

7. The electronic apparatus according to claim 1, further comprising a memory, wherein
   the extended service manager has service management information indicating an available memory size representing a size of a region in the memory available for the extended service, and
   the extended service manager executes the restriction on the extended service in accordance with the available memory size indicated by the service management information.

8. The electronic apparatus according to claim 1, further comprising a central processing unit, wherein
   the extended service manager has service management information indicating a maximum central processing unit usage rate representing a maximum rate of usage of the central processing unit by the extended service, and
   the extended service manager executes the restriction on the extended service in accordance with the maximum central processing unit usage rate indicated by the service management information.

9. The electronic apparatus according to claim 1, further comprising a storage device, wherein
   the extended service manager has service management information indicating an access range representing a range of the storage device accessible by the extended service, and
   the extended service manager executes the restriction on the extended service in accordance with the access range indicated by the service management information.

10. The electronic apparatus according to claim 1, wherein the extended service manager executes the restriction on an entire group of extended services.

11. The electronic apparatus according to claim 1, comprising an extended function service as the extended service that provides the extension application with an extended function of the standard function, wherein
    the extended service manager executes the restriction on an entire group of extended function services.

12. The electronic apparatus according to claim 1, wherein the extended service manager executes the restriction on a service as a combination of a plurality of extended services.

13. A non-transitory computer-readable recording medium with a program recorded on the recording medium, the program causing a computer of an electronic apparatus to serve as:
- at least one extended service that provides an extension application with a function other than a standard function of the electronic apparatus without using a standard application as an application realizing the standard function, the extension application being an application realizing the function other than the standard function;
- an extended service manager that manages the at least one extended service; and
- a backend service as the extended service that provides the extension application with a function other than an extended function of the standard function among functions other than the standard function, wherein
- the extended service manager executes a restriction on the extended service, and
- the extended service manager executes the restriction on an entire group of backend services.

14. The recording medium according to claim 13, wherein the extended service manager executes a restriction on the at least one extended service.

15. An electronic apparatus, having a hardware processor executing computer instructions, comprising:
- an extended service that provides an extension application with a function other than a standard function of the electronic apparatus without using a standard application as an application realizing the standard function, the extension application being an application realizing the function other than the standard function; and
- an extended service manager that manages the extended service,
- wherein the electronic apparatus further comprises a memory, and
- wherein the extended service manager executes a restriction on the extended service,
- wherein the extended service manager has service management information indicating an available memory size representing a size of a region in the memory available for the extended service, and
- wherein the extended service manager executes the restriction on the extended service in accordance with the available memory size indicated by the service management information.

16. An electronic apparatus, having a hardware processor executing computer instructions, comprising:
- an extended service that provides an extension application with a function other than a standard function of the electronic apparatus without using a standard application as an application realizing the standard function, the extension application being an application realizing the function other than the standard function; and
- an extended service manager that manages the extended service,
- wherein the electronic apparatus further comprises a central processing unit, and
- wherein the extended service manager executes a restriction on the extended service,
- wherein the extended service manager has service management information indicating a maximum central processing unit usage rate representing a maximum rate of usage of the central processing unit by the extended service, and
- wherein the extended service manager executes the restriction on the extended service in accordance with the maximum central processing unit usage rate indicated by the service management information.

17. An electronic apparatus, having a hardware processor executing computer instructions, comprising:
- an extended service that provides an extension application with a function other than a standard function of the electronic apparatus without using a standard application as an application realizing the standard function, the extension application being an application realizing the function other than the standard function; and
- an extended service manager that manages the extended service,
- wherein the electronic apparatus further comprises a storage device, and
- wherein the extended service manager executes a restriction on the extended service,
- wherein the extended service manager has service management information indicating an access range representing a range of the storage device accessible by the extended service, and
- wherein the extended service manager executes the restriction on the extended service in accordance with the access range indicated by the service management information.

* * * * *